United States Patent
Brooks

(10) Patent No.: US 10,159,243 B2
(45) Date of Patent: *Dec. 25, 2018

(54) AUGER SUPPORT STAND

(71) Applicant: Kevin Brooks, Leitchfield, KY (US)

(72) Inventor: Kevin Brooks, Leitchfield, KY (US)

(73) Assignee: Decoy Stake Solutions, LLC, Leitchfield, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/330,409

(22) Filed: Sep. 16, 2016

(65) Prior Publication Data

US 2017/0086452 A1 Mar. 30, 2017

Related U.S. Application Data

(63) Continuation-in-part of application No. 14/999,091, filed on Mar. 29, 2016, now Pat. No. 9,743,659, and a continuation-in-part of application No. 14/998,681, filed on Feb. 5, 2016, now Pat. No. 9,739,025, and a continuation-in-part of application No. 13/998,981, filed on Dec. 30, 2013, now abandoned, said application No. 14/998,681 is a continuation-in-part of application No. 14/121,468, filed on Sep. 9, 2014, now Pat. No. 9,347,733, and a continuation-in-part of application No. 14/121,469, filed on Sep. 9, 2014, now Pat. No. 9,316,016.

(60) Provisional application No. 62/386,730, filed on Dec. 10, 2015.

(51) Int. Cl.
*A45F 3/44* (2006.01)
*A01M 31/06* (2006.01)
*E04H 12/22* (2006.01)
*F16B 2/18* (2006.01)
*A01M 31/00* (2006.01)

(52) U.S. Cl.
CPC ............ *A01M 31/06* (2013.01); *A01M 31/00* (2013.01); *A45F 3/44* (2013.01); *E04H 12/2223* (2013.01); *F16B 2/185* (2013.01)

(58) Field of Classification Search
CPC ..... F41B 5/1453; A01M 31/00; F16M 13/022
See application file for complete search history.

(56) References Cited

U.S. PATENT DOCUMENTS

| | | | |
|---|---|---|---|
| 32,226 A | 4/1861 | Dotson | |
| 168,890 A | 10/1875 | Field | |
| 345,877 A | 7/1886 | Brainard | |
| 907,799 A | 12/1908 | Hawley | |
| 1,562,343 A | 11/1925 | Post | |
| 2,269,996 A | 1/1942 | Milton et al. | |
| 2,447,444 A | 8/1948 | Waite | |
| 2,563,159 A * | 8/1951 | Clark | ........................ G09F 1/14 248/156 |

(Continued)

*Primary Examiner* — Amy J. Sterling
(74) *Attorney, Agent, or Firm* — Carrithers Law Office PLLC

(57) ABSTRACT

An auger support stand for holding objects such as decoys above the ground. The auger support stand includes at least one rod of longitudinal member defining a shaft. The shaft includes a helical coil at the bottom end for fixedly screwing that end of the stake into the ground. The top end of the stake has a central rod including an S-shaped handle providing a crank handle for screwing the shaft into the ground. The top distal end of the shaft includes means for supporting an object.

29 Claims, 9 Drawing Sheets

(56) References Cited

U.S. PATENT DOCUMENTS

| | | | |
|---|---|---|---|
| 2,901,789 | A | 9/1959 | Frank |
| 3,688,454 | A | 9/1972 | Wolfcarius |
| 4,928,418 | A | 5/1990 | Stelly |
| 5,098,057 | A | 3/1992 | Gran |
| 6,116,760 | A | 9/2000 | Cox |
| 6,412,236 | B1 | 7/2002 | Johnson |
| 6,481,147 | B2 | 11/2002 | Lindaman |
| 6,487,977 | B1 | 12/2002 | Willaims |
| 6,698,132 | B1 | 3/2004 | Brint |
| 6,810,630 | B2 | 11/2004 | Chizmas |
| 6,901,693 | B1 | 6/2005 | Crowe |
| D550,071 | S | 9/2007 | Powell |
| D554,980 | S | 11/2007 | Mihelis |
| 7,493,873 | B2 | 2/2009 | Petersen |
| 8,230,638 | B1 | 7/2012 | Dunaway |
| 2005/0268522 | A1 | 12/2005 | Foster |

\* cited by examiner

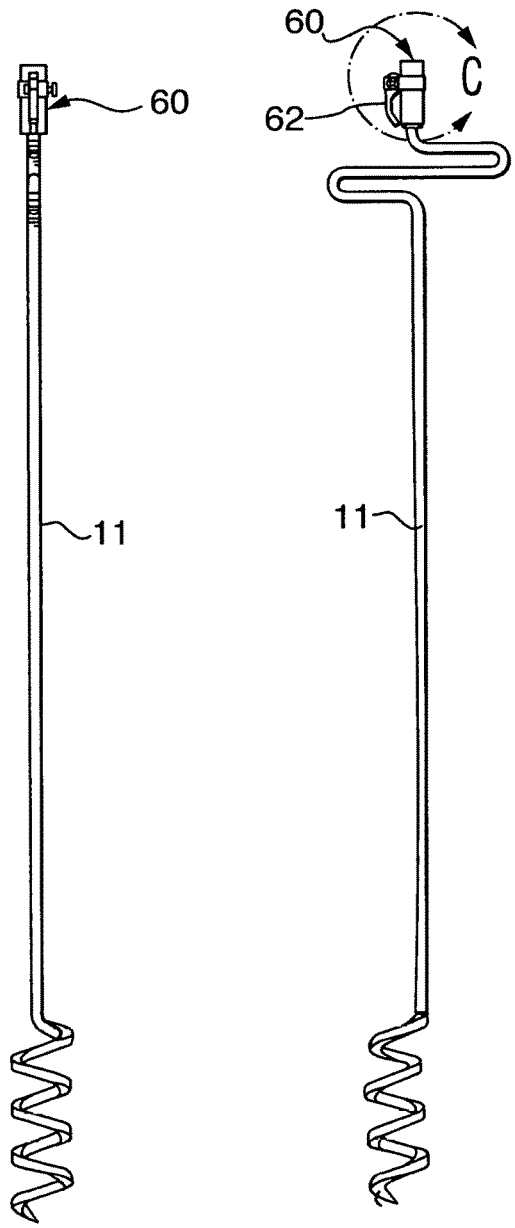
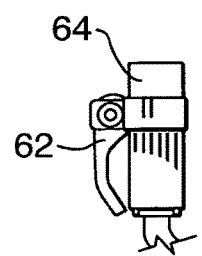
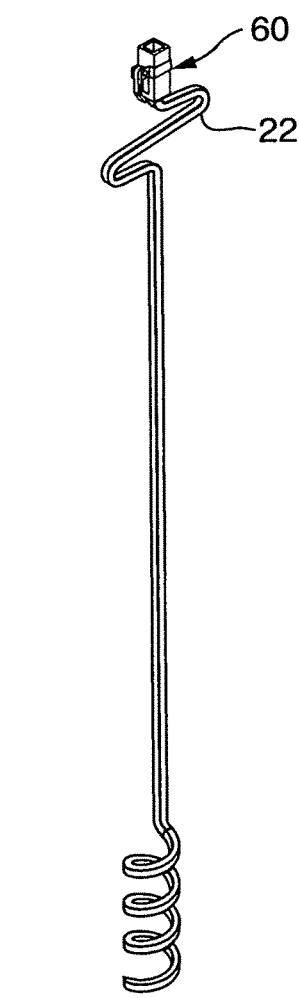
FIG. 4
FIG. 5
FIG. 6
FIG. 7

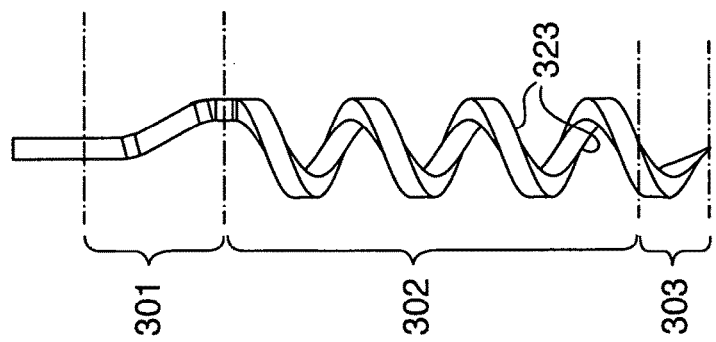
FIG. 20
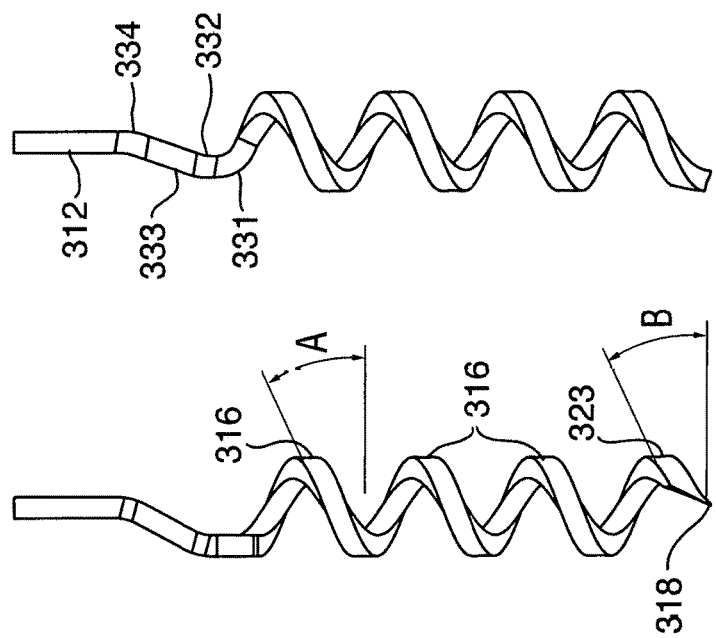
FIG. 19
FIG. 17
FIG. 18
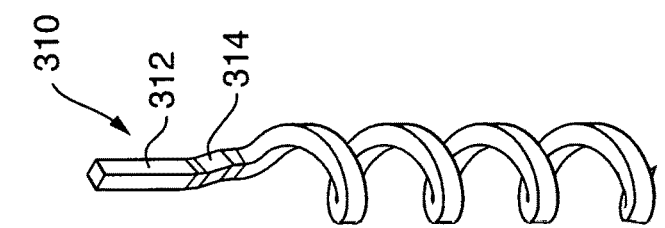
FIG. 16

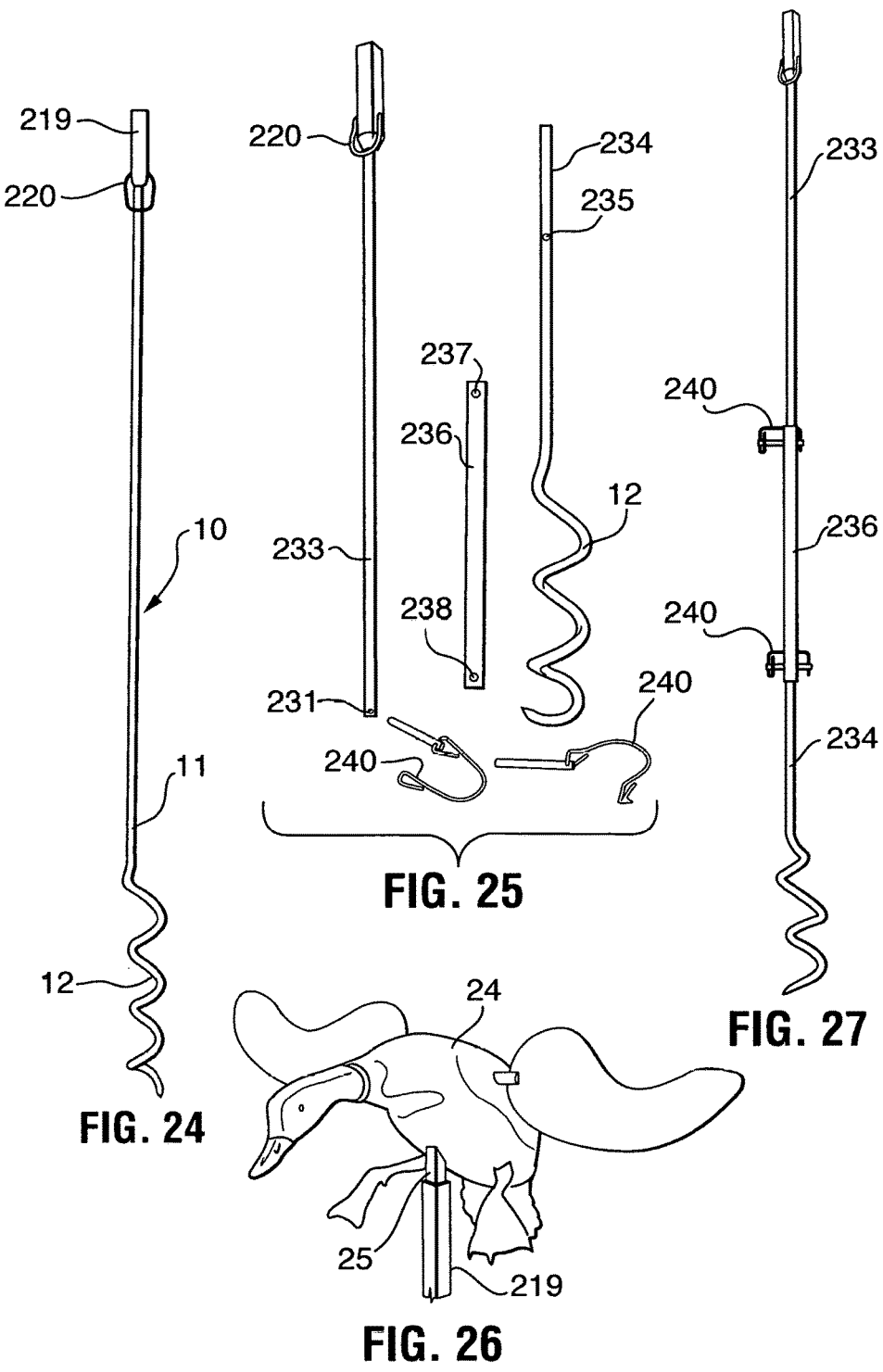

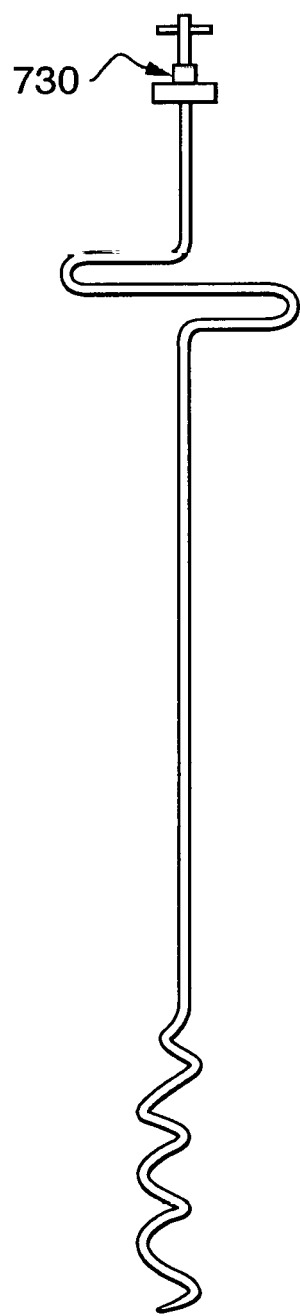
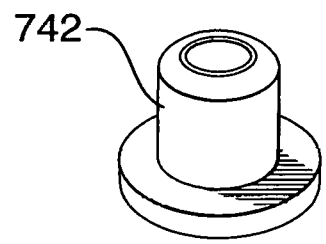
FIG. 30
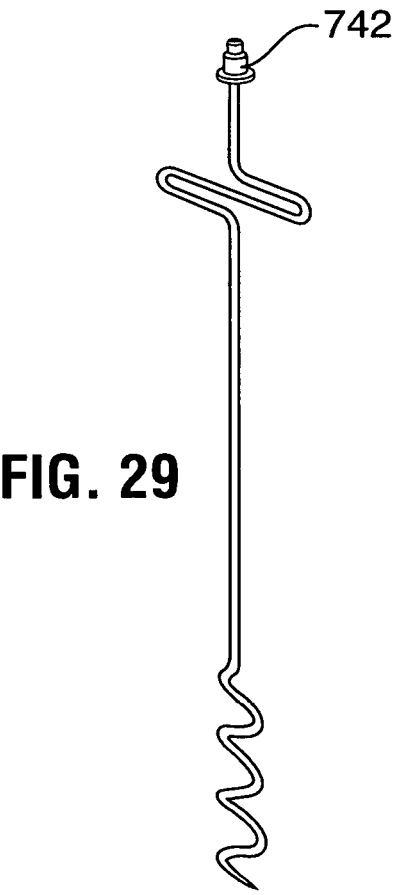
FIG. 29
FIG. 28

AUGER SUPPORT STAND

CROSS-REFERENCES TO RELATED APPLICATIONS

This application claims priority from U.S. Provisional Application Ser. No. 62/386,730 filed on Dec. 10, 2015 and is Continuation-In-Part of Ser. No. 14/999, 091 filed on Mar. 29, 2016 which is a Continuation-In-Part of U.S. application Ser. No. 14/999,498 filed on Feb. 25, 2016 and U.S. application Ser. No. 14/998,681 filed on Feb. 5, 2016 which claims priority and is a Continuation-In-Part of U.S. Pat. No. 9,347,733 which issued on May 24, 2016 from Ser. No. 14/121,468 filed on Feb. 25, 2016 and U.S. Pat. No. 9,316, 016 which issued on Apr. 19, 2016 from Ser. No. 14/121,469 filed on Apr. 19, 2016; and claims priority from pending U.S. application Ser. No. 13/998,981 filed on Dec. 30, 2013 all of which are incorporated herein in their entirety.

TECHNICAL FIELD

The present invention relates to the field of support stands for supporting objects above the ground.

BACKGROUND OF THE INVENTION

Duck hunters often use decoys for attracting ducks during a duck hunt. The decoys are typically displayed near or in the water and many are animated, that is, many decoys are provided with movable wings and heads which may or may not be motorized. Often times, decoys are attached to a pole or stake which holds the decoy in a preferred position which is likely to attract ducks. The decoy may be held above the water so that the motion of the wings gives the appearance of a duck landing on the water. Therefore, it is a requirement that the stake which holds the duck be firmly connected to the ground. Some decoy stakes have only one spiked end. Other decoy stakes have two spikes which are shoved into the ground: a stout primary spike and a lighter secondary parallel spike, the two spikes being simultaneously shoved into the ground. The stout spike gives the stake strength and rigidity and the lighter spike prevents the stake from spinning in the ground.

Decoy stakes are available from numerous sporting goods outlets which are similar in form to the stakes described above. However, the applicant is unaware of any decoy stakes available or any patents which include all of the elements and limitations of the herein described invention.

SUMMARY OF THE INVENTION

A rotary auger decoy mounting stand for removably holding a decoy upright on the ground. The stand includes an upright rod with a helical coil or flights forming an auger having a point at the lower distal end to be fixedly and removably screwed into the ground to support the stand in an upright position. The top end of the rod forming the stand body defines an S-shaped loop configured, sized and shaped and disposed at a selected angle to support a the arm of a decoy holding the decoy in a substantially vertical position above the ground. The integral loop which supports the is decoy forms a handle for the purpose of rotating the auger into the ground.

The present invention is for a rotary auger decoy stand comprising or consisting of an elongated vertical rod having a helical spiral coil extending downward therefrom a selected distance for penetration into the ground, and at least one "S" shaped loop extending from a top portion of said rod comprising at least two looped sections spaced apart from and in vertical alignment with one another for receiving a support member extending from a decoy.

A decoy stake for holding one or more in position to attract animals. The stake may comprise one shaft or two shaft portions that are fixed together by a clamping means. The shaft includes a helical coil at the bottom end for fixedly screwing that end of the stake into the ground. The top end of the stake has a central rod including an S-shaped handle providing a crank handle for screwing the shaft into the ground and at least two square receivers extending upward and outward from the central rod below the S-shaped handle for holding additional shafts with decoys mounted thereon. The shafts and shaft portions may have a round or square cross-section.

In accordance with the present invention, the decoy support stand can include multiple decoy attachment or holding means extending from a support shaft or stake comprising, consisting of, or consisting essentially of a lower stake portion having a first elongated rod with a helical coil formed at a bottom end thereof, a first receiver tube with clamping means at the top end thereof and an upper stake portion including a second elongated rod having a decoy fixed at the top end, an S-shaped crank handle formed therein within about five inches of a top end thereof. The second elongated rod has at least two decoy receiver tubes including clamping screws and extending outwards from below the S-shaped crank handle. The receiver tubes are canted upwards at an angle of fifteen to thirty degrees. Each of the at least two decoy receiver tubes removably and fixedly hold a rod/decoy combination comprising an elongated decoy rod with a decoy fixedly mounted at a first end and a second end being free. The free end of the second elongated rod of the upper stake portion is inserted into and removably and fixedly held by the first receiver tube of the lower stake portion with clamping means at the top end of the lower stake portion. The first elongated rod and the second elongated rod are one to four feet long.

When compared to a stake with one or two straight spikes, a helical coil is a superior form of attachment to the ground for a decoy stake. A stake screwed into soil provides a more stable anchor than a straight shaft of the same length engaging the ground. Moreover, the hunting area may be swampy or in a shallow lake or pond where the ground is muddy and soft. Sticking a spike into mud is not as secure as a connection made by screwing in a helical coil, even in the mud.

A preferred embodiment of the helical auger. A helix is a curve in three dimensional space having a tangent line and any point which makes a constant angle with a fixed line called the axis. The pitch of a helix is the width of one complete helix turn, measured parallel to the axis of the helix. A circular helix has a constant radius and constant band curvature and constant torsion.

The present invention comprises a helical auger including an inner bend diameter of a selected size such as ¼ inch bar stock, ³⁄₁₆ inch bar stock, ½ inch bar stock, ⅝ inch bar stock, and ⅜ inch bar stock; a helical pitch of 2.0 for 3.5 revolutions; a variable pitch of 3.0 for 0.25 revolutions; and a pitch diameter of 1.375 inches having a helical pitch of 2.0.

Thus in order to obtain a specif 30 degree angle at the bottom of the screw, the helical pitch as to vary from a constant 2 inches per revolution to 3 inches per revolution from section 2 to section 3. Thus the auger has a helical pitch of 2.0 at section 1 for 3.5 revolutions; a helical pitch at section 2 of 2.0 which changes to a variable pitch of 3.0 at section 3 for 0.25 revolutions. The pitch diameter is 1.375 inches.

It is an object of this invention to provide a portable and reusable decoy holder stand which includes a helical coil at one end which can be screwed into the ground.

It is an object of this invention to provide a decoy support stand which includes an integral crank handle for the purpose of screwing the stand into the ground.

It is an object of this invention to provide an integral crank handle for the purpose of screwing the stand into the ground wherein the crank handle services to support the arm of a decoy substantially vertically with respect to the ground.

It is another object of the present invention to provide a decoy holder wherein the integral handle serves to support the decoy in a rested position.

It is another object of the present invention to provide an integral handle decoy rest at an upper end of a shaft extending upwardly from the spiral auger wherein the handle decoy rest can be bent at a selected angle to hold the decoy in a selected position with respect to the surface of the ground.

It is an object of this invention to provide a multiple decoy stake with a helical coil at one end and a crank handle which can be used to thread the coil into the ground, thus forming a rigid connection with the ground and providing secure support for a decoy.

It is an object of this invention to provide a multiple decoy stake with a helical coil at the bottom end and a crank handle at the top end and also including at least two receiver tubes extending upwards and outwards from the shaft for holding rods which have additional decoys attached.

It is an object of this invention to provide a multiple decoy stake with a helical coil at the bottom end and a crank handle at the top end, the stake having two portions which are assembled to one another and held together by a clamp means. The clamp means is either a clamping screw or an eccentric lobe operated by a lever.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 4 is a front view of a lower portion of the stake wherein a means for holding a decoy comprises a sleeve defining a receiver having an eccentric lobe actuated by a lever holds the support member arm of a decoy in an upper sleeve portion affixed to the rod or shaft;

FIG. 5 is a side view of a lower portion of the stake wherein a means for holding a decoy comprises a sleeve defining a receiver having an eccentric lobe actuated by a lever holds the support member arm of a decoy in an upper sleeve portion affixed to the rod or shaft;

FIG. 6 is a perspective view of a lower portion of the stake wherein a means for holding a decoy comprises a sleeve defining a receiver having an eccentric lobe actuated by a lever holds the support member arm of a decoy in an upper sleeve portion affixed to the rod or shaft;

FIG. 7 is shows a cam mechanism providing holding and retaining means for releasably engaging and holding an arm or other support member of a decoy to the support stand;

FIG. 16 is a perspective view of a rotary auger helix having a straight top portion and a main body portion comprising a helix formed of stock having a square cross-section having a distal point cut creating a wedge shaped tip;

FIG. 17 is a perspective view showing the angle of the twists forming the flights of the helix stock surface and the angle of the wedge shaped tip;

FIG. 18 is a bottom end view of the rotary auger support of FIG. 16;

FIG. 19 is a left perspective rear view of a rotary auger support having a rectangular, or square cross section showing the straight top portion defining a tubular adapter extending from the top for cooperative engagement with a corresponding tube or bar stock shaft of an article to be supported thereon FIG. 20 is a left perspective rear view of a rotary auger support having a rectangular, or square cross section showing the straight top portion defining a tubular adapter extending from the top for cooperative engagement with a corresponding tube or bar stock shaft of an article to be supported thereon;

FIG. 24 shows a socket or sleeve holding means including a D-ring;

FIG. 25 shows the support stand comprising three sections;

FIG. 26 shows a decoy supported by an arm in cooperative sliding engagement with a sleeve mounted onto the top distal end of the rod;

FIG. 27 shows the assembled support stand sections of FIG. 25;

FIG. 28 shows a top distal end adapter or mounting means comprising a square rod with a locking pin;

FIG. 29 shows a top distal end adapter comprising a cap.

FIG. 30 is an enlarged view of the cap adapter of FIG. 29;

DESCRIPTION OF THE PREFERRED EMBODIMENTS

As used herein, the term "about" can be reasonably appreciated by a person skilled in the art to denote somewhat above or somewhat below the stated numerical value, to within a range of ±10%.

In accordance with the present invention, there is provided a decoy stake which holds a duck decoy in position for attracting ducks during a duck hunt.

The rotary auger decoy stand has a medial portion comprising an elongated rod and a bottom portion comprising a helical spiral coil having a point extending downward from the elongated rod for a selected distance for penetration into the ground. The top portion defines a decoy arm rest support comprising at least one curved "S" shaped loop portion extending upwardly from a top distal end of the elongated rod, the "S" shaped loop portion including a first straight section extending outwardly from the elongated rod at a selected angle from the top distal end of the elongated rod. A first curved end section extends from a distal end of the first straight section returning 180 degrees extending inwardly toward the elongated rod forming a second straight section spaced apart, parallel, and in alignment with the first straight section extending past the elongated rod. A second opposing curved end section returns 180 degrees extending inwardly forming a third straight section extending from the second opposing curved end section spaced apart, parallel, and in alignment with the first straight section and the second straight section.

Figures 1, 2, 3:
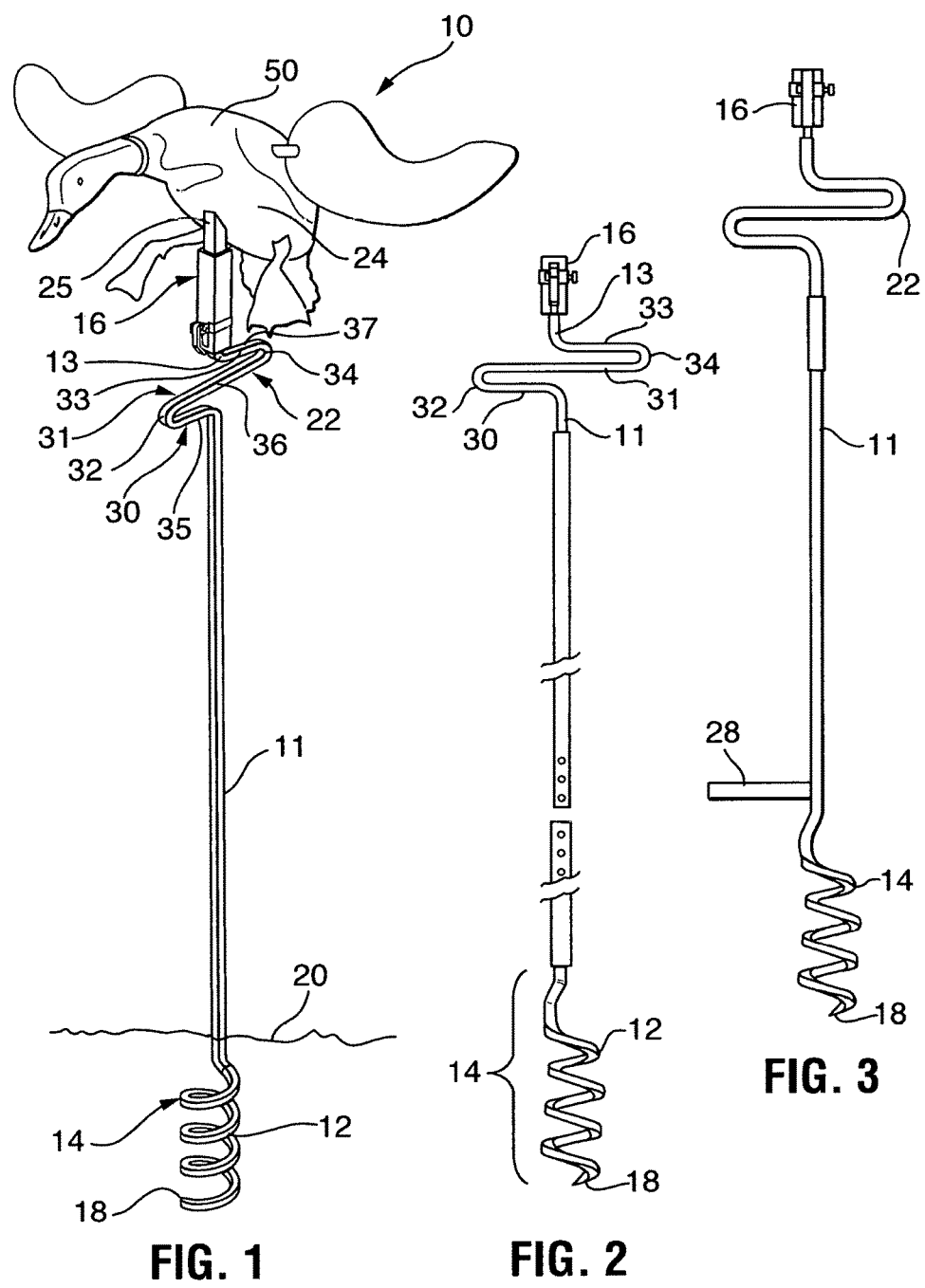
FIG. 1 is a perspective view of the decoy mounting support stand.
FIG. 2 is a front view of the decoy mounting stand having cooperatively engaging sections.
FIG. 3 is a front view of the decoy mounting stand showing a foot rest cross bar.
Figure 8:
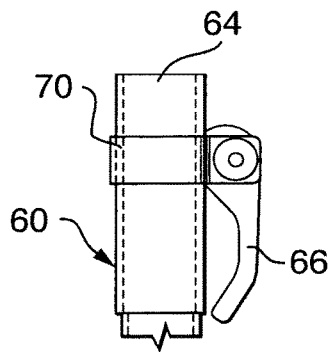
FIG. 8 is shows a cam mechanism providing holding and retaining means for releasably engaging and holding an arm or other support member of a decoy to the support stand.
Figure 11:
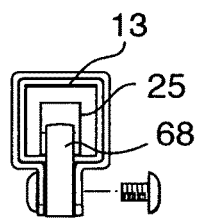
FIG. 11 is shows a cam mechanism providing holding and retaining means for releasably engaging and holding an arm or other support member of a decoy to the support stand.
Figure 14:
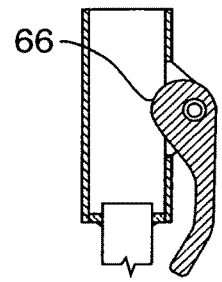
FIG. 14 is shows a cam mechanism providing holding and retaining means for releasably engaging and holding an arm or other support member of a decoy to the support stand.
Figure 9:
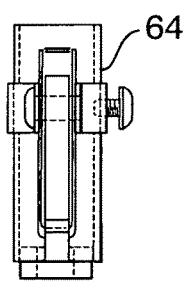
FIG. 9 is shows a cam mechanism providing holding and retaining means for releasably engaging and holding an arm or other support member of a decoy to the support stand.
Figure 12:
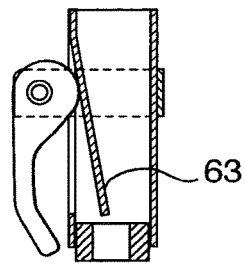
FIG. 12 is shows a cam mechanism providing holding and retaining means for releasably engaging and holding an arm or other support member of a decoy to the support stand.
Figure 15:
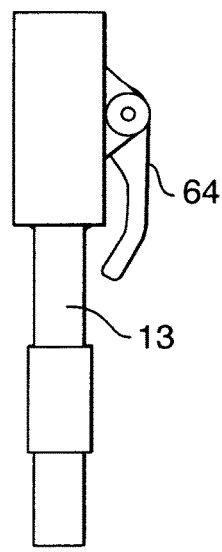
FIG. 15 is a side view of the sleeve receiver clamp with the eccentric lobe actuated by a lever.
Figure 10:
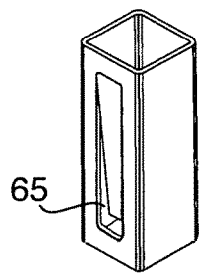
FIG. 10 is shows a cam mechanism providing holding and retaining means for releasably engaging and holding an arm or other support member of a decoy to the support stand.
Figure 13:
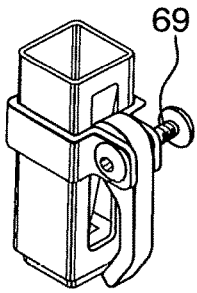
FIG. 13 is a cut-away view of a sleeve receiver clamp with the eccentric lobe actuated by a lever.

More particularly, the present invention and depicted in FIG. 1, there is provided a rotary auger decoy stand 10 which holds a decoy 24 in position above the ground for the intended user. The integral handle decoy includes a holding means, support or rest 16 located at an upper end of a vertical longitudinal member defining a rod or shaft 11 extending upwardly from a auger 14 comprising a helical coil 12 wherein the decoy 24 includes a support member or arm 25 can be bent at a selected angle to hold the decoy in a selected position with respect to the surface of the ground.

The rotary auger decoy mounting stand 10 provides a portable outdoor rest for removably holding a decoy upright on the ground. The stand includes an above ground upright rod or shaft 11 having a bottom portion for insertion into the ground comprising a helical coil 16 forming an auger 14 having a point 18 at the lower distal end to be fixedly and removably screwed into the ground 20 to support the stand 10 in an upright position. The top end of the rod 11 forming the stand body defines a handle comprising an S-shaped loop configured, sized and shaped and disposed at a selected angle ranging from 0 to 180 degrees from a vertical position to support an arm 30 of a decoy 32 holding the decoy in a substantially vertical position above the ground. The integral loop handle 22 which supports the is decoy serves as means rotating the auger 14 into the ground.

A short segment of the shaft or elongated rod extends above the integral crank handle 22 to support an arm 25 of a decoy 24 substantially vertically with respect to the ground. As shown in the figures, a decoy 24 is removably held in position whereby the weight of the decoy 24 is supported by holding means defining a sleeve 26 extending from the distal end of a handle 22 defining an S-shaped loop. The integral handle 22 extends from a top portion of the support rod 11 from the vertical axis a selected first length 35 and includes a bottom first horizontal portion 30 extending outwardly from the rod 11 at a selected angle at about a right angle of 90 degrees. A middle second horizontal portion 31 extends upwardly over, spaced apart from, and in parallel alignment with the bottom first horizontal portion 30 a selected second length 36 which is twice a long as the selected first length 35. A curved or bent bottom connecting first curved portion 32 connects the outer end of the bottom first horizontal portion 30 with an outer end of the middle second horizontal portion 31 extending past the vertical axis of the shaft 11. An upper horizontal portion 33 extends upwardly over, spaced apart from and in parallel alignment with the middle second horizontal portion 31. A curved or bent bottom connecting second curved portion 34 connects the outer end of the middle second horizontal portion 31 with an outer end of the upper second horizontal portion 33. The upper horizontal portion 33 extends inwardly toward the vertical axis of the shaft 11 a third length 37 which is equal to the first length 35, curving upward forming a top distal end 13 of the rod or shaft 11 in alignment in alignment therewith.

A short lever, cross member, or bar 28 can be affixed to a lower portion of the rod 11 for providing a foot rest to aid in penetrating the surface of the ground when prior to rotation of the support stand.

The holding means 16 for removably retaining and tightening a decoy arm 25 in cooperative engagement comprises a sleeve or more preferably a cam mechanism 60. As shown in FIGS. 7-15, the cam mechanism 60 includes a hollow square body 64 affixed to the top distal end 13 of the rod or shaft 13 extending above the handle 22. The cam body 64 includes an opening in a side wall on one side so that a lever 66 having a cylindrical cam head 68 is pivotally held by a pin 69 in alignment with the opening 65 in the cam body 64 by a peripheral collar 70 extending around the cam body 64 providing cooperative engagement with the head of the cam lever when the cam lever is pivoted outwardly normal therefrom biasing the cam lock against a the arm 25 member held therein securely retaining same against the distal end 13 of the shaft 11.

The cam mechanism may also include a strip or flap of metal 65 which extends from the cam body in alignment with the cam head whereby rotation of the cam head biases the flap 65 against the arm 25 of the decoy 24 removing securing same to the distal end 13 of the support stand 10.

As illustrated in FIGS. 16-20, the rotary auger comprises a helical spiral 310 that includes an above ground upright rod or shaft top portion 11 with an auger 14 having an offset neck 314 connecting to a main body portion 302 comprising a plurality of helixes 316. A distal end segment 303 comprises a half helix ending in a sharp point 318. A main body portion helixes 316 is comprised of bar stock having a square cross sectional area. The corners 321 or the square bar stock form cutting edges 323 when the stock is bent or formed into a helix. One preferred embodiment of the instant invention includes a main body portion 302 having three full helixes and a tip portion 303 comprising a half helix. The neck 314 of the helix is angled inwardly toward the center of the main body portion 302 in order to center the shaft top portion 312 with respect to the main body portion 302. The neck portion includes a helix first segment 331, a short straight inward angled second segment 332, a straight angled third segment 333, a short straight outward angled fourth segment 334, connecting to a vertical straight top segment 312 of a desired length.

The helical spiral rotary auger 310 has a bottom portion for insertion into the ground comprising a helical coil 316 having cutting edges with a wedge point 318 at the lower distal end to be fixedly and removably screwed into the ground 20. Formation of the helical auger 310 from a rod of bar stock having a square or rectangular cross-sectional area forms an auger with plane surfaces which can obtain purchase with loose soil or sand like flights yet the tight helical formation provides a tight spiral and small tight cross section enabling the auger to rotate in clay soil, rocky soil, or soil having roots whereby the helical coil 316 can slide around and between obstacles to penetrate the ground.

The cutting edges of the helix enable the auger to cut through soil and debris for ease of rotation and deep ground penetration which includes the desirable features of helix flights.

Moreover, the auger of the present invention is an improvement over the flights of conventional augers in that the narrow diameter of the stock and diameter of the flights enables the auger to cut and drill through small openings in rocky soil and wedge between rocks. The square stock helical spiral 310 of the present invention can be rotatably inserted into hard clay which would resist penetration by an auger having flights or a helix auger comprising round stock.

A preferred embodiment of the helical auger includes a top vertical portion for mounting an adapter or article to be supported thereon, a neck, a main body portion and a tip portion including a distal end forming a wedge or pointed segment. An inner bend diameter of a selected size such as ¼ inch bar stock, 3/16 inch bar stock, ½ inch bar stock, 5/8 inch bar stock, and 3/8 inch bar stock. The 3/8 inch rotary auger support includes an effective helical pitch of 2 for every 3.5 revolutions and a variable pitch of 3.0 for every 0.25 revolutions. The pitch diameter of 1.375 inches has a helical pitch of 2.0 inches. As best illustrated in FIG. 17 the angle of the twists forming the flights of the helix of the main body portion are angled forming a plane at about 30 degrees shown as angle "A", however, the range could extend from 15 to 45 degrees.

The square bar stock is 3/8 inch in width and the distal end of the tip forming a penetrating or cutting edge is cut at a about a 33 degree angle, Angle "B", forming an angled wedge of 5/8 inch in length forming a tip comprising a cutting wedge point 18 for easy insertion into rocky ground and grounds containing roots. It is contemplated that the angle of the wedge could range from 15 to 45 degrees depending upon the application. The top section 301 is about 4 inches in length, the main body portion 302 comprises four helixes totaling seven inches in length, and the bottom section 303 is about 0.625 inches in length. A round or pointed tip 318 may also be utilized for particular types of substrates such as clay soil.

Figure 21:
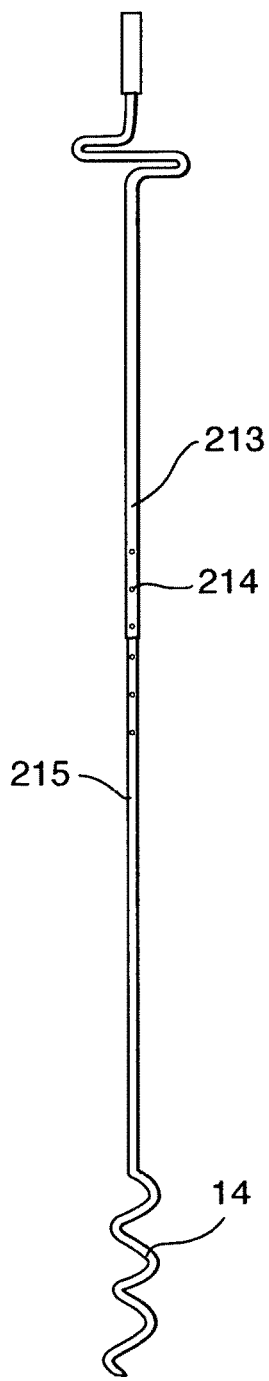
FIG. 21 shows the support stand comprising of two sections which slidably and cooperatively engages a corresponding sized and shaped second section.

FIGS. 21 shows the support stand 10 wherein the rod 11 comprise of two sections whereby a first section 213 is comprises at least a mid end tubular section which slidably and cooperatively engages a corresponding sized and shaped second section 215. The sections may include a corresponding hole and pin assembly 215 or include distal threaded members for holding the sections together.

Figure 22:
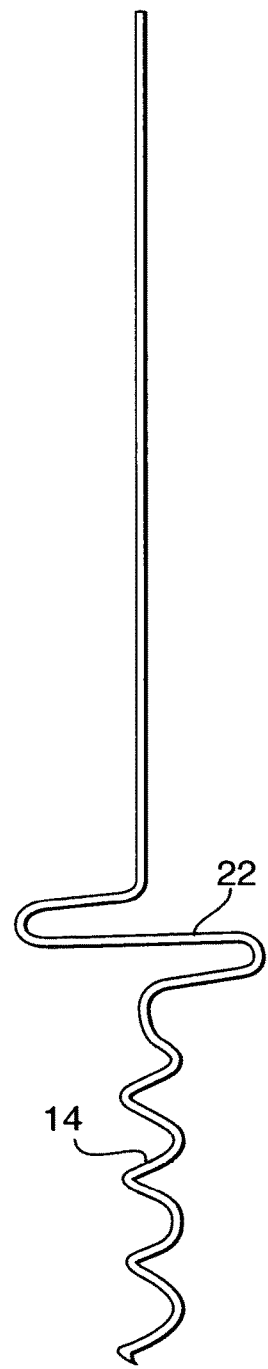
FIG. 22 shows a handle disposed at a lower position on the rod with respect to the auger.
Figure 23:
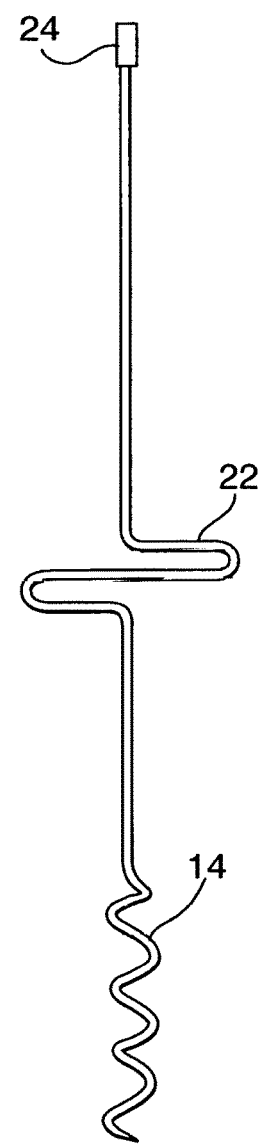
FIG. 23 shows a handle disposed at a lower position on the rod with respect to the auger.
Figure 31:
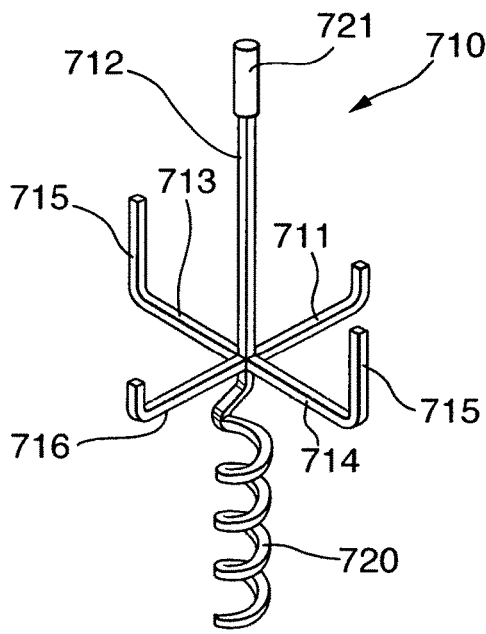
FIG. 31 is a perspective view of the rotary ground auger base and stand showing the spiral auger extending from the lower distal end of the vertical support rod including an adapter depicted as a cylindrical sleeve on the top distal end thereof and a plurality of lateral support legs disposed normal thereto forming a base above the spiral with the legs including upturned distal end arm portions forming handles.
Figure 32:
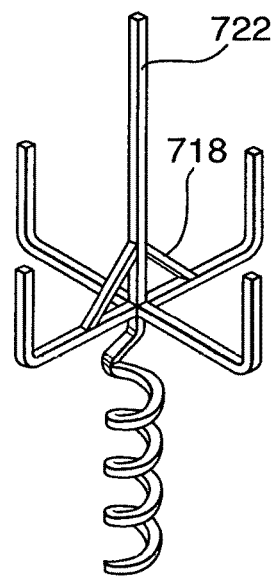
FIG. 32 is a perspective view of the rotary ground auger base and stand showing the spiral auger extending from the lower distal end of the vertical support rod which extends upwardly forming an integral support rod, handle, and mounting or holding means for a decoy extending from a top distal end thereof and a plurality of lateral support legs disposed normal thereto forming a base above the spiral with the legs including upturned distal end arm portions forming handles.
Figure 33:
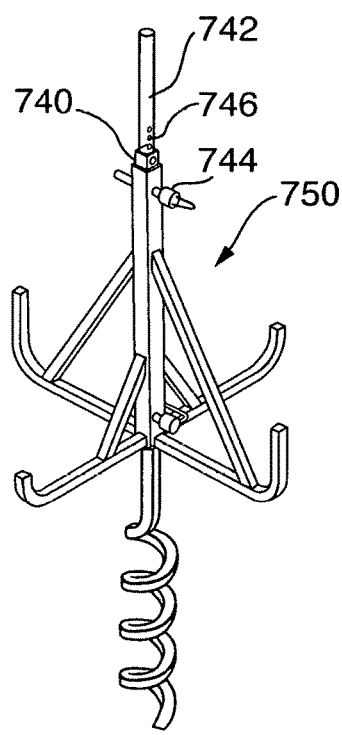
FIG. 33 is a perspective view of a rotary ground auger base and stand including a telescoping shaft having a plurality of coaxial rods disposed therein which can be extended and held in position at a selected height by a pin extending through corresponding holes formed in the shafts at selected locations.
Figure 34:
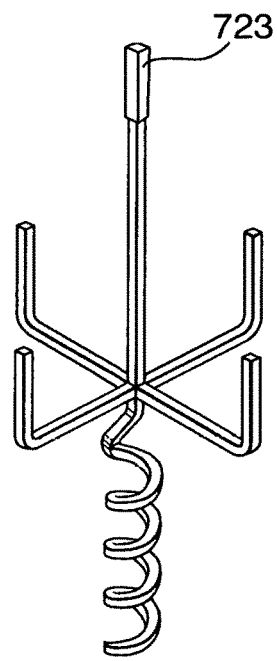
FIG. 34 is a perspective view of the rotary ground auger base and stand showing the spiral auger extending from the lower distal end of the vertical support rod including an adapter defining a sleeve having a square cross sectional area disposed on the top distal end thereof and a plurality of lateral support legs disposed normal thereto forming a base above the spiral with the legs including upturned distal end arm portions forming handles.

FIGS. 22-23 show the handle 22 disposed at a lower position on the rod 11 with respect to the auger 14. The upper portion of the rod 11 can be of any desired length, but is typically 1-6 feet long.

FIG. 24 shows a socket or sleeve holding means 219 including a D-ring 220.

FIG. 25 shows the support stand comprising three sections, a top section 233, middle section 236, and lower section 234, wherein the rod 233 can be connected by cooperatively engaging the sections wherein the center section slides over the lower end of the top section and the upper end of the bottom auger section and is held together by pins 240 inserted through correspondingly aligned holes (231 and, 237), and 238 and 235) of the overlapped portions of the sections as shown in FIG. 27.

FIG. 26 shows a decoy 24 supported by an arm 24 in cooperative sliding engagement with a sleeve 219 mounted onto the top distal end of the rod 11.

FIG. 28 shows a top distal end adapter or mounting means comprising a square rod 32 with a locking pin. FIG. 29 shows a top distal end adapter comprising a cap. FIG. 30 is an enlarged view of the cap adapter of FIG. 29.

As shown in FIG. 31-34, the rotary ground auger base and stand 710 comprises or consists of a base having a plurality of legs extending outward perpendicular to the vertical axis with at least two opposing legs including arms 715 extending upward from the distal ends perpendicular thereto in the vertical axis. An elongated shaft 712 with a distal top end 722 having a mounting means or adapter means such as a cylindrical socket 721, a square sleeve 723, a cap 742, a T-bar 730 arrangement with tie loop or D-ring, or an extending shaft portion at the top extends from a vertical rod or shaft extending from the base which sets on the ground a top distal end including a cap 742 forms a rounded head with a horizontal disc receives different types of decoys and cameras. A spiral auger comprising a helical coil 720 extends from the bottom of the base and includes spaced apart opposing laterally extending legs 711, 713, 714 and 716 for providing additional lateral support by bracing the stand against the ground. Legs 713 and 714 are opposite one another as are legs 711 and 716. Legs 713 and 714 have upward extending arms 715 which are used as hand cranks to screw the helical coil 720 into the ground until the legs are in contact with the ground.

The legs may include braces defining triangular rods or plates 718. It is contemplated that all four of the legs include upwardly extending arms forming handles projecting from the distal ends of each leg; however, at least a pair of opposing legs are provided with arms for rotation of the auger into the ground. The rotary ground auger base and stand can include a vertical telescoping shaft 740 or telescoping rod 742 extending upward from the base wherein a pin 742 cooperatively engaging through bores or a spring loaded detent (ball and socket) arrangement 744 is utilized to hold the shaft at an extended or collapsed condition.

Figure 35:
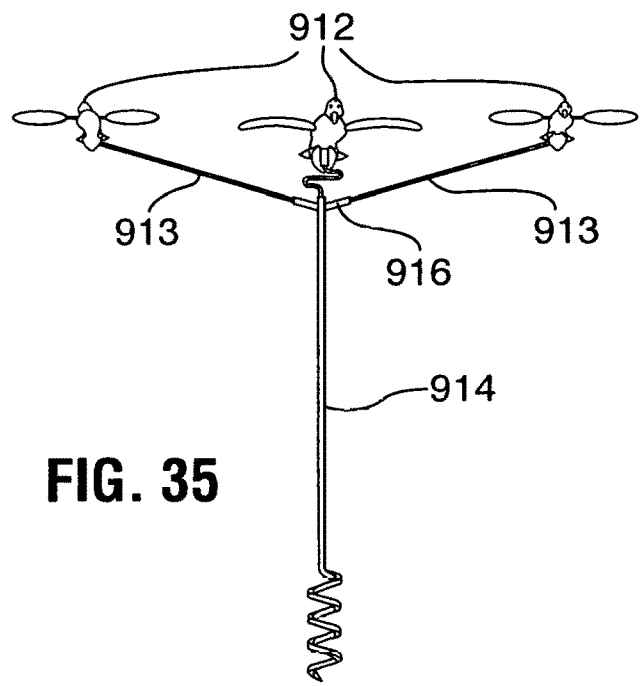
FIG. 35 is a front view of the a multiple decoys fixed on the upper portion of the stake.
Figure 36:
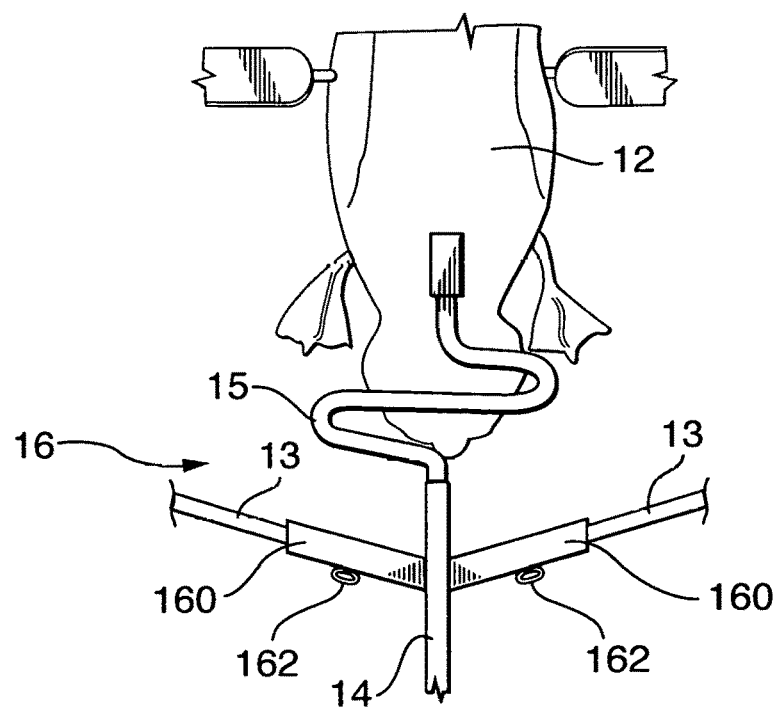
FIG. 36 is a front view of the upper end of the upper portion of the stake particularly showing the square receivers and the S-shaped crank handle.

FIGS. 35-36 show a multiple decoy stake includes a two part rod, including and upper portion 914 and a lower portion 920. The free lower end of the upper portion 914 is inserted into a receiver tube 922 at the top end of the lower portion 920 which includes a clamping means to removably and fixedly hold the upper portion 914 within the lower portion 920.

The upper portion of a multiple decoy stake which includes an elongated shaft 914. The lower portion 920 of the shaft terminates at the bottom end in the shape of a helical coil 930. Further, the rod 921 includes a receiver tube 922 at the top distal end, with an adapter tube portion 222 and an eccentric lobe 224 actuated by a lever 228. The helical coil 930 can be welded onto the end of a rod or fabricated by twisting the rod 11 in order to produce an integral one piece auger, rod, and handle assembly. The distal end of the rod 920 typically includes a pointed end 950 for piercing the ground.

Below the handle 915 are two receiver tubes 960 which extend outward and are canted upward by an angle of preferably 15 to 30 degrees. Each receiver tube 960 includes a clamping screw 962 for fixedly but removably holding rods 913. Each of the rods 913 contains another decoy 912. The bottom end of upper shaft portion 914 is inserted into the receiver tube 922 at the top end of the lower shaft portion 920 and is locked into position by moving the clamp lever 928 downwards, thus forcing the eccentric lobe 924 against the upper shaft portion 914.

Multiple decoy replaces the receiver tube with an alternate receiver tube which uses a clamping screw rather than an eccentric lobe to hold the upper shaft portion fixed to the lower shaft portion.

It is anticipated that the shaft portions be made of iron, steel or any material capable of supporting decoys in windy or turbulent conditions. However, it is also contemplated that portions of the multiple decoy stake may be fabricated from carbon fiber, fiberglass, or even molded from high density plastic in an integral form or in individual sections.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A rotary auger decoy stand comprising:
   a medial portion comprising an elongated rod having at least one section;
   a bottom portion comprising a helical spiral coil having a point extending downward from said elongated rod for a selected distance for penetration into the ground;
   handle means for rotating said rotary auger decoy stand formed at a selected position of said medial portion, said handle comprising at least one curved "S" shaped loop portion including a first straight section extending outwardly from said elongated rod at a selected angle from said top distal end of said elongated rod, a first, curved end section extending from a distal end of said first straight section returning 180 degrees extending inwardly toward said elongated rod forming a second straight section spaced apart, parallel, and in alignment with said first straight section extending past said elongated rod, and a second opposing curved end section returning 180 degrees extending inwardly forming a third straight section extending from said second opposing curved end section spaced apart, parallel, and in alignment with said first straight section and said second straight section; and
   holding means for supporting a decoy.

2. The rotary auger decoy stand of claim 1, wherein said medial section, said decoy supporting section, and said bottom section are integrally formed from a single elongated rod.

3. The rotary auger decoy stand of claim 1, wherein said holding means comprises a sleeve disposed on a top distal end of said top portion said sized and shaped for coaxial cooperative engagement with a decoy support member extending from said decoy.

4. The rotary auger decoy stand of claim 1, wherein said holding means comprises a sleeve disposed on a top distal end of said top portion sized and shaped for coaxial cooperative engagement with a decoy support member extending from said decoy including a retaining means for releasably and immovably securing said decoy in said holding means.

5. The rotary auger decoy stand of claim 1, wherein said retaining means comprises a cam mechanism for releasably tightening said decoy support member within said sleeve.

6. The rotary auger decoy stand of claim 1, said helical spiral coil further comprising:
   a selected length of bar stock having a square cross sectional area including a bottom portion bent into a helix;
   a vertical straight top portion;
   a neck portion extending downward from said vertical straight top portion;
   a main body portion extending downwardly from said neck portion, said main body portion comprising a helical helix coil extending downward therefrom a selected distance;
   a distal end segment comprising a half helix extending downward from said main body portion; and
   said distal end segment including a point for penetration into the ground.

7. The rotary auger decoy stand of claim 6, wherein said main body portion comprises a helical pitch of 2 for every 3.5 revolutions and a variable pitch of 3.0 for every 0.25 revolutions.

8. The rotary auger decoy stand of claim 6, wherein said main body portion comprises a pitch diameter of 1.375 inches and a helical pitch of 2.0 inches.

9. A rotary auger support stand comprising:
   a) an elongated medial section comprising at least one elongated vertical rod;

b) a handle section formed at a selected position of said medial section, said handle section comprising at least one loop;
c) means for mounting a decoy extending from a top distal end of said medial section;
d) a bottom section extending from a bottom distal end of said medial section, said bottom section comprising a helical auger portion comprising:
  I) a selected length of bar stock having a square cross sectional area including a bottom portion bent into a helix comprising:
  ii) a vertical straight top segment;
  iii) a neck portion extending downward from said vertical straight top segment;
  iv) a main body portion extending downwardly from said neck portion, said main body portion comprising a helical coil extending downward therefrom a selected distance and having a helical pitch of 2 for every 3.5 revolutions;
  v) a distal end segment comprising a helical coil portion extending downward from said main body portion; and
  vi) said distal end segment including a point for penetration into the ground.

10. The rotary auger support stand of claim 9, wherein said medial section comprises at least two detachable sections joined in cooperative engagement.

11. The rotary auger support stand of claim 9, wherein said means for mounting comprises a lug, a cylindrical receiving sleeve, a square receiving sleeve, a cap, a receiver having an eccentric lobe actuated by a lever for holding a lug therein, a receiver having a cam mechanism actuated by a lever for holding a lug therein, and combinations thereof.

12. The rotary auger support stand of claim 9, said handle section further comprising a loop including a first portion extending outwardly from said medial section at a right angle and a second portion extending upwardly over and spaced apart from and in alignment with said first portion extending past said medial section a selected equal distance from said medial section and a third portion extending downward spaced apart from and in alignment with said second portion extending inwardly a selected distance in alignment with said medial section.

13. A rotary auger support stand, comprising:
a) a helical auger portion comprising:
  I) a selected length of bar stock having a square cross sectional area including a bottom portion bent into a helix comprising:
  ii) a vertical straight top segment;
  iii) a neck portion extending downward from said vertical straight top segment;
  iv) a main body portion extending downwardly from said neck portion, said main body portion comprising a helical coil extending downward therefrom a selected distance and having a helical pitch of 2 for every 3.5 revolutions and a variable pitch of 3.0 for every 0.25 revolutions;
  v) a distal end segment comprising a half helical coil extending downward from said main body portion; and
  vi) said distal end segment including a point for penetration into the ground;
b) an elongated medial section comprising an elongated vertical rod extending upward from said vertical straight top segment of said helical auger portion;
c) a handle section disposed at a selected position of said medial section; and
d) means for mounting a decoy extending from a top distal end of said medial section.

14. The rotary auger support stand of claim 13, said handle section comprising a handle section disposed located comprising a curved rod having at least one "S" shaped section having at least two opposing looped sections spaced apart from and in alignment with one another, said at least two opposing looped sections including a first portion extending outwardly from said medial section at a right angle and a second portion extending upwardly over and spaced apart from and in alignment with said first portion forming a first curved loop extending past medial section a selected equal distance from said medial section and a third top portion extending upwardly over and spaced apart from and in alignment with said second portion forming a second curved portion extending a selected distance in alignment with said medial section.

15. The rotary auger support stand of claim 13, wherein said medial section comprises at least two detachable sections joined in cooperative engagement.

16. The rotary auger support stand of claim 13, wherein said means for mounting comprises a lug, a cylindrical receiving sleeve, a square receiving sleeve, a cap, a receiver having an eccentric lobe actuated by a lever for holding a lug therein, a receiver having a cam mechanism actuated by a lever for holding a lug therein, and combinations thereof.

17. The rotary auger support stand of claim 1, wherein said medial section comprises at least two detachable sections joined in cooperative engagement.

18. The rotary auger support stand of claim 1, wherein said holding means for mounting comprises a lug, a cylindrical receiving sleeve, a square receiving sleeve, a cap, a receiver having an eccentric lobe actuated by a lever for holding a lug therein, a receiver having a cam mechanism actuated by a lever for holding a lug therein, and combinations thereof.

19. The rotary auger decoy of claim 6, wherein said medial section comprises at least two detachable sections joined in cooperative engagement.

20. The rotary auger decoy of claim 6, wherein said holding means for mounting comprises a lug, a cylindrical receiving sleeve, a square receiving sleeve, a cap, a receiver having an eccentric lobe actuated by a lever for holding a lug therein, a receiver having a cam mechanism actuated by a lever for holding a lug therein, and combinations thereof.

21. The rotary auger decoy of claim 6, further comprising a handle section further comprising a first loop extending past said medial section a selected distance and a second opposing loop extending past said medial section a selected distance.

22. The rotary auger decoy of claim 6, said handle section further comprising a loop including a first portion extending outwardly from said medial section at a right angle and a second portion extending upwardly over and spaced apart from and in alignment with said first portion extending past said medial section a selected equal distance from said medial section and a third portion extending downward spaced apart from and in alignment with said second portion extending inwardly a selected distance in alignment with said medial section.

23. A rotary auger decoy stand, further comprising:
a selected length of bar stock having a cylindrical cross sectional area including a bottom portion bent into a helix;
a vertical straight top portion;
a neck portion extending downward from said vertical straight top portion;

a main body portion extending downwardly from said neck portion, said main body portion comprising a helix coiling downward therefrom a selected distance;

a distal end segment comprising a half helix extending downward from said main body portion; and said distal end segment including a point for penetration into the ground.

24. The rotary auger decoy of claim 23, wherein said vertical straight top portion comprises at least two detachable sections joined in cooperative engagement.

25. The rotary auger decoy of claim 24, wherein said vertical straight top portion includes holding means for mounting comprises a lug, a cylindrical receiving sleeve, a square receiving sleeve, a cap, a receiver having an eccentric lobe actuated by a lever for holding a lug therein, a receiver having a cam mechanism actuated by a lever for holding a lug therein, and combinations thereof.

26. The rotary auger decoy of claim 23, wherein said vertical straight top portion includes holding means for mounting comprises a lug, a cylindrical receiving sleeve, a square receiving sleeve, a cap, a receiver having an eccentric lobe actuated by a lever for holding a lug therein, a receiver having a cam mechanism actuated by a lever for holding a lug therein, and combinations thereof.

27. The rotary auger decoy of claim 23, wherein said vertical straight top portion further comprises a handle section.

28. The rotary auger decoy of claim 27, wherein said handle section comprises a first loop extending past said vertical top section a selected distance and a second opposing loop extending past said vertical top section a selected distance.

29. The rotary auger decoy of claim 27, said handle section further comprising a loop including a first portion extending outwardly from said vertical top section at a right angle and a second portion extending upwardly over and spaced apart from and in alignment with said first portion extending past said vertical top section a selected equal distance from said vertical top section and a third portion extending downward spaced apart from and in alignment with said second portion extending inwardly a selected distance in alignment with said vertical top section.

* * * * *